(No Model.)

H. POTTIN.
RECORDING AND REGISTERING APPARATUS FOR TILLS.

No. 312,014. Patented Feb. 10, 1885.

WITNESSES:

E. B. Bolton
Geo. H. Fraser

INVENTOR:

Henry Pottin,
By his Attorneys.
Burley Fraser & Bennett (No Model.)

H. POTTIN.

RECORDING AND REGISTERING APPARATUS FOR TILLS.

No. 312,014. Patented Feb. 10, 1885.

WITNESSES:

E. B. Bolton
Geo. H. Fraser

INVENTOR:

Henry Pottin,
By his Attorneys,
Burky Fraser & Bennett (No Model.) 5 Sheets—Sheet 3.

H. POTTIN.
RECORDING AND REGISTERING APPARATUS FOR TILLS.

No. 312,014. Patented Feb. 10, 1885.

Fig. 3.

WITNESSES:
E. B. Bolton
Geo. H. Fraser.

INVENTOR:
Henry Pottin
By his Attorneys,
Burke Fraser & Connett (No Model.) 5 Sheets—Sheet 4.

H. POTTIN.
RECORDING AND REGISTERING APPARATUS FOR TILLS.

No. 312,014. Patented Feb. 10, 1885.

Fig. 4.

WITNESSES:
E. B. Bolton
Geo. H. Fraser

INVENTOR:
Henry Pottin
By his Attorneys,
Burke Fraser & Bennett (No Model.)

H. POTTIN.
RECORDING AND REGISTERING APPARATUS FOR TILLS.

No. 312,014. Patented Feb. 10, 1885.

WITNESSES:

INVENTOR:
Henry Pottin,
By his Attorneys,

UNITED STATES PATENT OFFICE.

HENRY POTTIN, OF PARIS, FRANCE.

RECORDING AND REGISTERING APPARATUS FOR TILLS.

SPECIFICATION forming part of Letters Patent No. 312,014, dated February 10, 1885.

Application filed February 13, 1884. (No model.) Patented in England July 4, 1883, No. 3,313.

*To all whom it may concern:*

Be it known that I, HENRY POTTIN, a citizen of the French Republic, and a resident of Paris, France, have invented certain Improvements in Counting and Registering Apparatus for Cashiers, of which the following is a specification.

My invention relates to a machine for counting, registering, and adding sums of money received or paid, and is designed for the use of cashiers, bank-tellers, and others who receive and disburse moneys. To satisfy all the requirements of an apparatus of this character it should perform the functions following:

First. When the cashier has received a sum of money from a customer, it is necessary that the figures representing the sum paid shall be made to appear first to the cashier in order that he may know that they are correct.

Second. If the sum indicated is incorrect, he should be able to correct it before the customer sees the figures, and before the sum is "totalized," or carried to the total for the day.

Third. When the cashier ascertains that the figures are correct, he should then be able to show them to the customer.

Fourth. The cashier should be able to print the sum on a slip, ticket, or invoice for the customer, and at the same time on a strip of paper within the machine, which forms a register or day-book, upon which all the separate sums are entered.

Fifth. The several sums received during the day should be added together by the operation of the machine, in order that the proprietor may ascertain by inspection the sum total at the end of each day or any other period.

Sixth. The mechanism should be such that after each transaction the indicating-drums bearing the numerals may all be brought to zero—that is, so that only noughts or blanks will show.

My apparatus effects all of these several operations.

The accompanying drawings show the preferred form of my apparatus.

Fig. 6 is a section of the totalizing mechanism cut in a plane perpendicular to the plane of Fig. 5, as indicated by the line 6 6 in Fig. 5; Fig. 9 is a fragmentary detail view looking in the direction of arrow 9 in Fig. 2.

Figures 1, 7, 8:
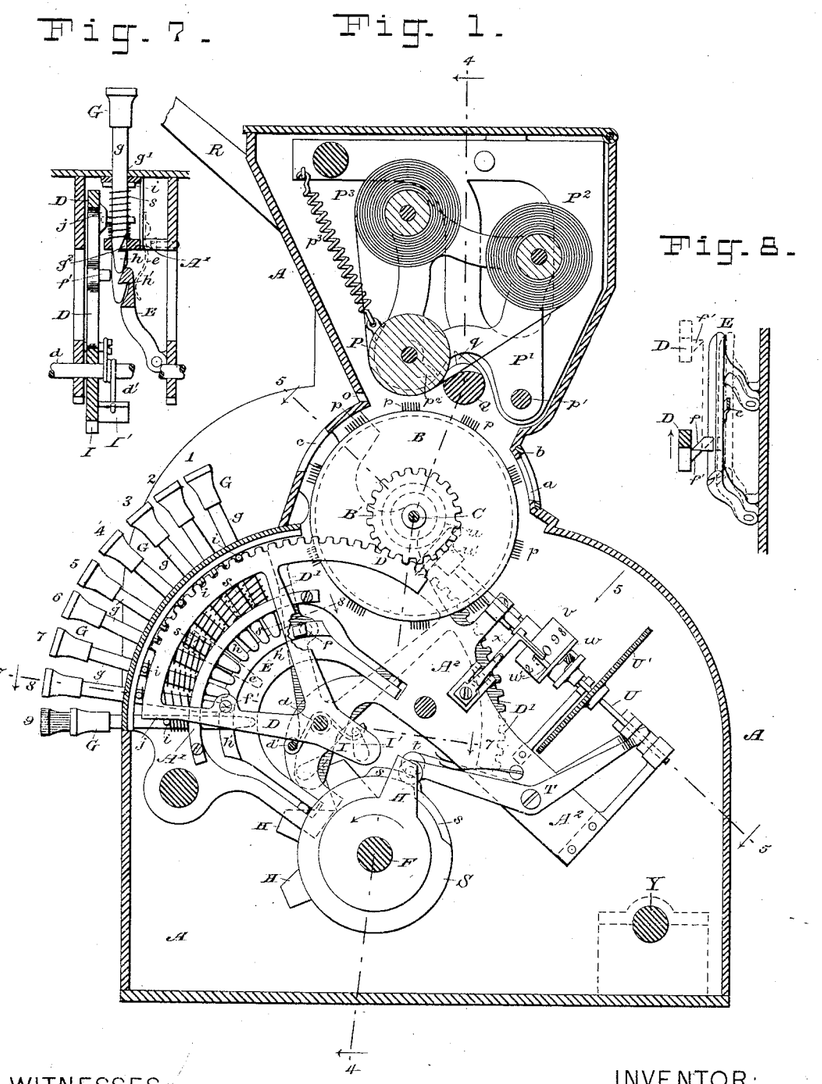
Figure 1 is a vertical section cut in the plane of the line 1 1 in Fig. 4.
Figs. 7 and 8 are fragmentary sectional detail views, their sections being cut respectively in the planes of the lines 7 7 and 8 8 in Fig. 1.
Figure 4:
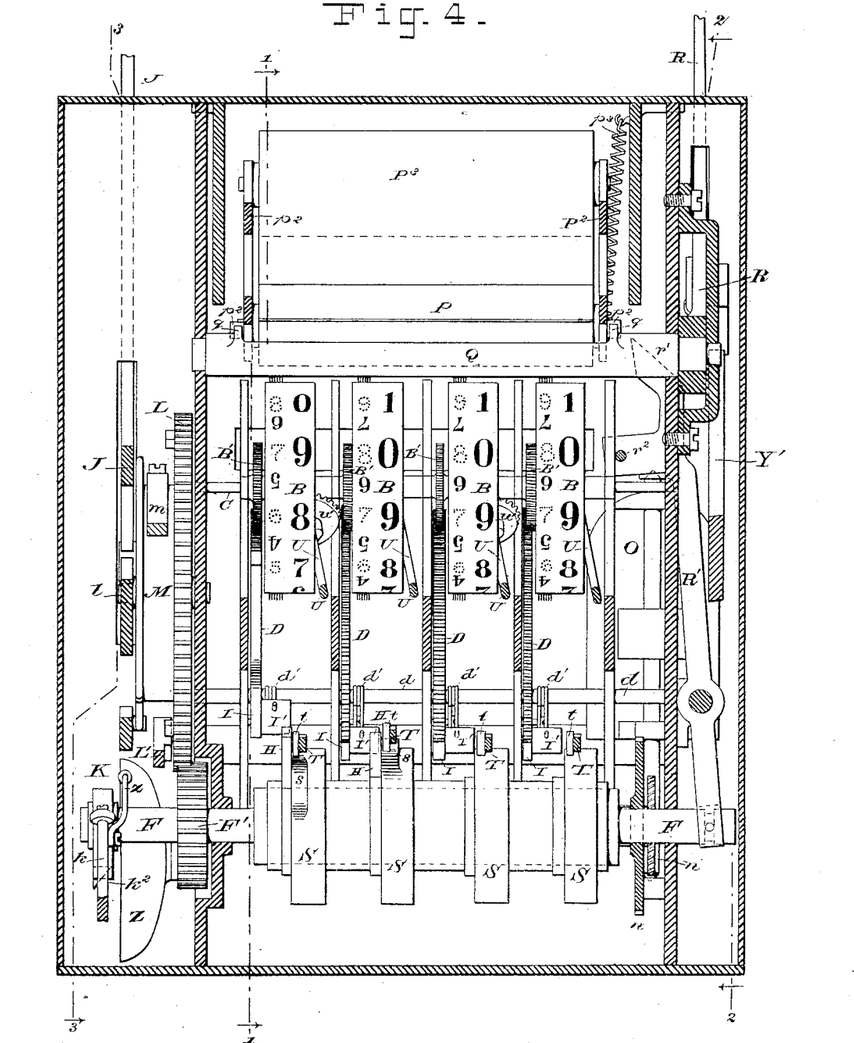
Fig. 4 is a vertical section cut in the plane of the lines 4 4 in Figs. 1 and 2, and looking in the direction of the arrows 4.
Figure 5:
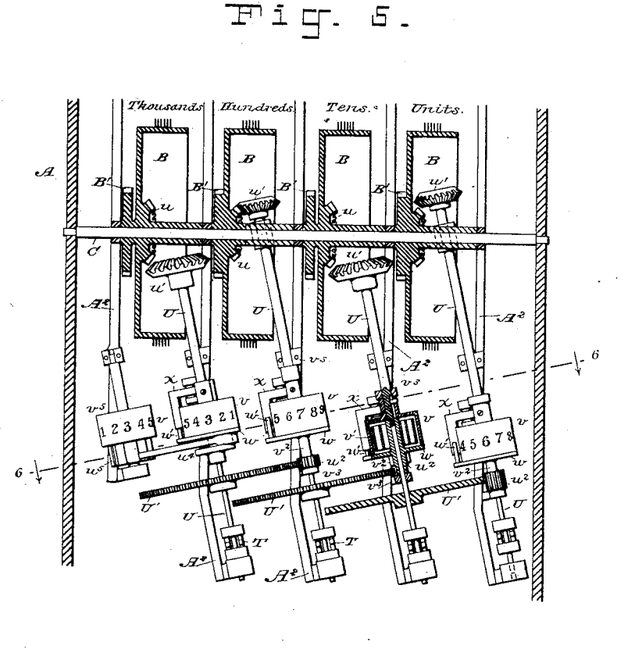
Fig. 5 is an oblique elevation, showing only the totalizing mechanism, looking in the direction of arrow 5 in Fig. 1, and partly in section on the plane of line 5 5 therein.
Figure 8:
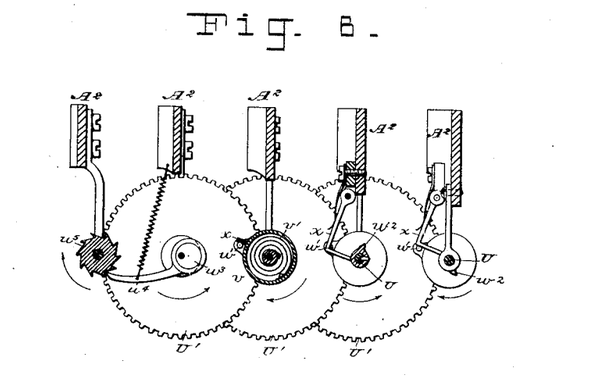

Let A designate, generally, the inclosing-case of the apparatus, constructed to conceal the working parts and prevent unauthorized access to them. In this case are mounted a series of wheels or drums, B B, having each two series of digits, from 0 to 9, marked on their peripheries. The digits of the first series are in large and prominent figures, and those of the second in smaller figures, inverted relatively to the first, and arranged at one side, as clearly shown in Fig. 4. In the front of the case are a series of openings, which come close to these wheels, through each of which may be seen one of the series of large figures on each wheel. One of these openings (lettered *a*) is shown in Fig. 1, and also in section is shown a slide, *b*, which covers the row of openings, and has openings registering with them, whereby on being slid to one side it closes the openings *a a*, and to the other side it opens them. The small inverted figures of the second series are not visible through these openings, but coincide with a series of openings on the opposite side of the apparatus, one of which (lettered *c*) is seen in Fig. 1. There will be as many wheels B B as there are figures in the highest number designed to be registered by the apparatus. This will be determined by the requirements of the particular currency used in the transactions to be recorded. Thus for the United States there should be one wheel for cents, one for dimes, one for dollars, one for tens of dollars, one for hundreds, and so forth, as high as it may be desired to go. The drawings show only four of these wheels, as these are sufficient to illustrate all the requisites of the apparatus. The wheels B B are mounted loosely on a fixed shaft or rod, C, extending through the apparatus, as shown in Fig. 5, and each wheel has fixed to it a gear, B'. Meshing with the several gears B' B' are as many toothed racks or segments D D, one of which is clearly shown in Fig. 1. Each rack D has an extreme limit of motion equal to nine spaces, or sufficient to turn the wheel B nine-tenths of a revolution, or from 0 to 9. The wheel B, (shown in Fig. 1,) which is the one shown at the left in Fig. 4, has been turned to this extent. In so turning it its rack D has dropped or moved a distance of nine spaces. A rack, D, (also lettered D',) is shown in Fig. 1 in its normal position, being drawn partly in full lines and partly in dotted lines. The several racks D D are shown as made in the form of segments, and mounted to oscillate freely on a shaft, $d$, being each provided with a small spring, $d'$, to start it on its backward or downward movement. Thus each rack D has imparted to it by this spring or by its own weight, or both, a continual tendency to move backward and downward and to impart a forward rotary movement to the wheel B, geared to it. At one side of each rack D is arranged a pivoted frame or lever, E, which is pressed toward the rack by a spring, $e$, (shown in dotted lines in Figs. 1 and 7,) and constitutes a detent. On the frame E is a beveled projection or tooth, $f$, which engages a similar projection, $f'$, on the rack, as shown best in Fig. 8. Normally, the rack is held from falling by the engagement of these teeth $f f'$; but if the frame E be pressed to the right in Figs. 7 and 8 the tooth $f$ will free itself from the tooth $f'$ and release the rack D, as shown in dotted lines in Fig. 8, whereupon the rack will commence its descent.

Projecting from the rear of the apparatus, on the side on which the cashier or operator is stationed, are several series of keys or push-buttons, G G. Each series consists of nine buttons arranged one below another, and numbered from 1 to 9 from the top downward, as indicated by the numbers opposite them in Fig. 1. There will be as many series or vertical rows of these buttons as there are wheels B B. One button alone is shown in Fig. 7. Each button is, as there shown, mounted on a pin or stem, $g$, which passes through a hole, $g'$, in the casing and through another hole, $g^2$, in a frame, A', inside. These holes form bearings to guide the stem $g$ as the button is pushed in, and between the two bearings a helical spring, $s$, is coiled around the stem and arranged to press outward against a small pin, $i$, fixed transversely in the stem, thus pressing the button outward. The inner end of the stem $g$ is beveled, and comes just in front of the beveled edge of the frame E, and just back of this beveled end the stem $g$ is notched to form a hook, $h$. The frame E is made with an undercut groove, which forms its curved end into a continuous hook, $h'$, as best seen in cross-section in Fig. 7. When any button G is pressed in, its beveled end wipes over the edge of the frame E, thereby pressing the frame to one side and freeing the teeth $f f'$, as described, and the hook $h$ on the stem $g$ engages with the hook $h'$ on the frame E, and holds the button pressed in. The rack D, being released by the freeing of its tooth $f'$, begins its movement, and continues to move until a projection, $j$, Fig. 7, on its edge encounters the pin $i$ of the button G, which has been pressed in, whereupon it is stopped by that pin. The nine buttons G G of each series and their stems $g$ $g$ are equally spaced in succession, and each successive button is arranged to stop the rack D at the completion of an additional one-ninth of its movement, the pressing in of the upper button, 1, stopping the rack when it has made one-ninth of its movement, the pressing in of the second button, 2, stopping it when it has made two-ninths, and so forth, the lower button, 9, stopping it when it has moved nine-ninths, or its utmost movement. The wheels B B stand normally with 0, appearing both at opening $a$ and at opening $c$. If the button 1 be pressed in, the rack D will move one-ninth of its movement, and will turn the wheel B, with which it is geared, one-tenth of a revolution, thereby displaying 1 at the openings $a$ and $c$. If the button 9 be pressed, the rack will move nine-ninths of its movement and turn the wheel nine-tenths of a revolution, thereby displaying 9 at the openings $a$ and $c$.

I will now describe the restoring mechanism, or means for turning the racks D and wheels B back to zero. On a shaft, F, passing through the machine, are fastened a series of radial arms, H H, having disk-like hubs. There are as many arms as there are racks D D. On each rack D is formed a tail or crank, I, and projecting from each tail I is formed a tooth or pin, I'. As the shaft F rotates in the direction of the arrow in Fig. 1 the arm H encounters the projection I' and pushes it to the rear, thereby moving the rack D up to its normal position and turning the wheel B backward to zero. When the normal position is reached, the arm H escapes beneath the projection I' and is free. As the rack D reaches its normal position its tooth $f'$ encounters the tooth $f$, and by wiping over its beveled face pushes the frame E to one side far enough to free the hook $h$ of the button G, whereupon the button springs outward again, and as tooth $f'$ passes the tooth $f$ the frame E springs back to place and engages the teeth $f f'$ again. The several arms H H are arranged radially one in advance of another, as seen in Fig. 1, in order to act successively on the racks D D. They are so proportioned that if all the racks D had been dropped to 9, only one would be replaced at a time, the first coming to rest before the second commenced to move, and so on through the entire series. The "units" (cents) rack will be first restored, the "tens" (dimes) the second, the "hundreds" (dollars) the third, &c.

The restoring operations are performed by one rotation of the shaft F in the direction of the arrow in Fig. 1. This rotation is accomplished through clock-work by mechanism shown best in Fig. 3.

Figures 2, 3:
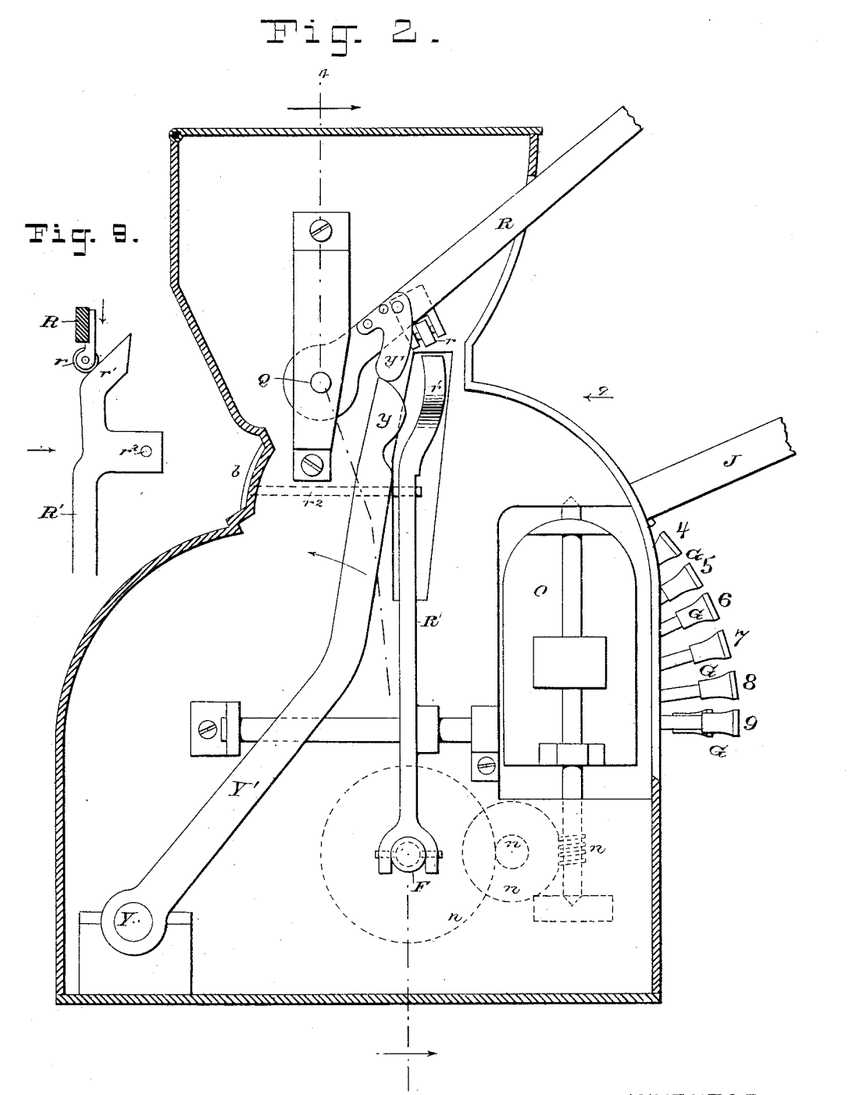
Fig. 2 is a side elevation of the left-hand side of the machine, a portion of the inclosing-case being in section on line 2 2 in Fig. 4.
Fig. 3 is a similar elevation of the right-hand side of the machine, the inclosing-case being partly in section on line 3 3 in Fig. 4.
Figure 3:
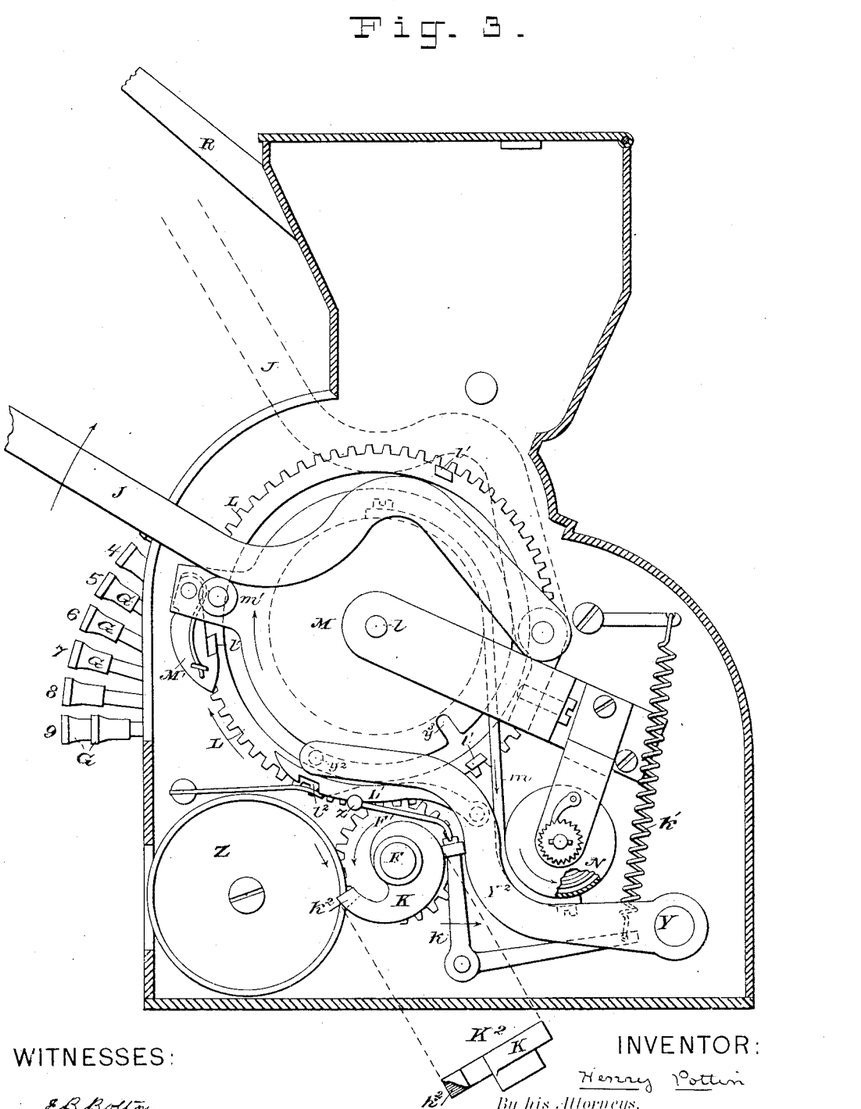

On the end of shaft F are fixed a pinion, F', and a snail-cam, K. The pinion meshes with a large gear-wheel, L, having three times as many teeth. This wheel L is mounted on a short arbor, $l$, and close beside it on this arbor is a wheel, M, to which is fastened one end of a strap, (or chain,) $m$, the other end of which wraps around a barrel, N, inclosing a clock-spring, which tends to rotate it in the direction of the arrow marked on it. The wheel M bears a pawl or catch, M', the hooked end of which is adapted to engage either of three teeth, $l'$ $l'$ $l'$, on the wheel L. A hand-lever, J, is pivoted within the case, and projects out through a slot, where it can be grasped by the operator. Normally this lever stands in the position shown in dotted lines, and the wheel L is locked fast by one of its teeth $l'$ being confined in a notch, $l^2$, in a pawl, L', which is pivoted to the fixed frame or casing. When the operator pulls down on the lever J, it encounters a roller, $m'$, borne by the wheel M, and presses it down, thus rotating the wheel backward and winding on it the strap $m'$, which it unwinds from the barrel N. The wheel M executes one-third of a revolution, until its pawl M' presses up the pawl L'. The lever J is then released and the tension of the spring in N causes the wheel M to revolve forward to its normal position, carrying the wheel L with it, and thus rotating the wheel F' and shaft F one revolution, at the end of which the pawl L' again engages a tooth $l'$. The parts are shown in Fig. 3 at about the middle of this upward movement. The speed of rotation of the shaft F is governed by a fan or flier, O, (shown in Figs. 2 and 4,) which is driven from the shaft through a train of gears, $n$ $n$. (Shown in dotted lines in Fig. 2.)

I will now describe how the several amounts are printed or recorded on a strip of paper. Each wheel B bears three sets of figures, as clearly shown in Fig. 4, two of which I have already described. The third set consists of types formed of groups of needle-points $p$ $p$, the figures being thus composed of dots. These are arranged between the small figures of the second series, as shown. When the large figure 0 or 1 appears through the opening $a$ and the small figure 0 or 1 appears at $c$, the corresponding needle-figure stands at the top of the wheel B, in close proximity to a roller, P, mounted in a frame, P', pivoted at $p'$, Fig. 1. A strip of paper unwinds from a roller, $P^2$, passes beneath the roller P, and winds on a roll, $P^3$. On the frame P', close to each bearing of the roller P, is a tooth, $p^2$. (Shown in dotted lines in Fig. 1.) An oscillating shaft, Q, passes through the frame, and has a tooth, $q$, which when the shaft is oscillated presses down the tooth $p^2$, rocks the frame P', and brings the roller P down against the needle-types $p$, thus pricking the number through the strip of paper. By inserting a check-slip or invoice through a slot, $o$, the needles will prick through both, and the slip on being withdrawn will bear the perforated figures denoting the amount recorded. As the shaft Q oscillates back it releases the frame P', which is drawn up by a spring, $p^3$, and in ascending the strip of paper is fed by any suitable devices, which, being well known, are not illustrated. The shaft Q is oscillated by pulling down a hand-lever, R, at the left-hand side of the machine. (Shown best in Fig. 2.) This lever bears a roller, $r$, which acts on the inclined surface $r'$ of a lever, R', as best seen in Fig. 9, and so tilts this lever. This lever bears a pin, $r^2$, which moves the register-slide $b$ on this movement of the lever, and so uncovers the openings $a$ $a$. The lower end of this lever is coupled to the end of shaft F, and so moves this shaft endwise. On this shaft F are fixed a series of circular cams, S S—one to each wheel B—which cams serve to operate the "totalizing mechanism" or integrator through rollers $t$ $t$ on the ends of levers T T. The right-hand side (in Fig. 4) of each cam S is a plain cylinder, while its left-hand side has cam projections or depressions $s$ $s$. Normally the shaft F stands at the left, (in Fig. 4,) so that the rollers $t$ $t$ roll on the cylindrical portions of the cams, and the "totalizer" is not operated; but on pulling this shaft to the right, as in Fig. 4, the projections and depressions come under the rollers $t$ $t$ and the totalizer is brought into action.

Enough of the mechanism has now been described to enable the operation of the apparatus to be understood.

When the cashier receives a sum of money, he proceeds to record it. Suppose the amount to be $20.47. He will first press in the button 2 of the thousands series, (tens of dollars,) which is at his right hand. He will skip the hundreds (units of dollars) series, because the wheel B of this series already stands at zero. He will then press button 4 of the tens (dimes) series, and finally button 7 of the units (cents) series. The number will appear to him in reverse, thus: "74.02," through the series of openings, $c$. If on reading it here he should discover that he had made any mistake, he would pull down the right-hand lever J, and thereby restore the indicating-wheels to zero without either printing or totalizing the incorrect amount. This result is due to the action of the arms H H, which turn back the racks, the cams S S being impotent to actuate the totalizer, because their plain cylindrical portions are under the rollers $t$ $t$. But if the cashier, on reading the number at $c$, finds it correct, he pulls the left-hand lever R, which moves the slide $b$ to uncover the openings $a$ $a$, thereby exposing the amount "20.47" in large figures, to the view of the customer, and at the same time printing or perforating it on the strip of paper, and also, if desired, on a ticket or invoice which the cashier will have inserted in the slit $o$. The amount having been correctly indicated, the cashier then pulls the lever J, at the right, which causes the shaft F to make one revolution and simultaneously restores the indicating mechanism to zero, and actuates the totalizer, which adds the amount recorded to the total of the amounts previously recorded. When the shaft F completes its revolution, a bell, Z, rings, thus indicating that the operation is finished, and a new amount may be recorded, and simultaneously the slide $b$ moves back and closes the apertures $a\ a$.

It will be observed that when the lever J is pulled first the totalizer is not actuated, but when the lever J is pulled after the lever R has first been pulled the totalizer is actuated. This result is due to the longitudinal displacement of the shaft F by the lever R′ and to the formation of the cams S S, as already described. The shaft F is moved endwise back to its first position at the conclusion of its revolution by the action of the snail K. A lever, $k$, has a roller on its end, which rides on this snail, and is pressed toward the snail by a spring, $k'$. As the shaft F revolves the snail presses back the lever $k$ until the latter stands opposite the end $k^2$ of the snail, which is beveled, as shown best in the edge view at $K^2$, under Fig. 3. The roller, impelled by the spring $k'$, rolls down this incline, and so moves the snail and the shaft F endwise back to place, at the same time also replacing the lever R′ and the slide $b$. The lever $k$ bears on its end an elastic hammer-arm carrying a hammer, $z$, which as the lever descends from the end of the snail strikes a blow upon the gong Z.

I will now describe the totalizing mechanism, referring to Figs. 1, 5, and 6. Inside each wheel B is fixed a bevel-gear, $u$, having ten teeth, and a gear, $u'$, having also ten teeth, is fixed on the upper end of a diagonal arbor, U. The successive gears $u'\ u'$ are arranged alternately above and below the gears $u\ u$. The foot of each arbor U is engaged by the end of one of the levers T. Normally the several gears $u'\ u'$ are moved away from the gears $u\ u$ far enough to be out of mesh therewith, and it is only when the arbors U U are raised or lowered by the levers T T that the gears $u'$ are brought into mesh. This raising or lowering of the arbors is determined by the projections or depressions $s\ s$ on the cams S S acting on the rollers $t\ t$. Each arbor U (except the first or units arbor) has a gear, U′, fixed on it, and each one (except the last or, in the construction shown, thousands arbor) bears a pinion, $u^2$. The gears U′ have each ten times as many teeth as the pinions $u^2$, so that one rotation of either pinion will turn the gear with which it is in mesh one-tenth of a revolution. Each arbor U bears a cup-shaped wheel or drum, $v$, (shown in section in Fig. 5,) which is splined to it, so as to turn with it, and its periphery is marked with digits from 1 to 9 and 0. In each cup $v$ is a coiled spring, $v'$, as shown on the tens-arbor in Fig. 5, where the cup is in section. One end of this spring is attached to the cup, and the other end to a disk, $w$, which is fixed on the hub or sleeve of the pinion $w^2$, which is loose on the arbor. Each disk $w$ has a pin, $w'$, which is engaged by a detent or small lever, $x$, Fig. 6, which is pivoted to a frame, $A^2$, and is pressed toward the arbor by a light spring, and has a leg which rests against the hub of the cup $v$, on which is formed a tooth, $w^2$. As the arbor U and cup $v$ revolve the spring $v'$ tends to make the disk $w$ and pinion $w^2$ revolve also, but they are restrained by the pin $w'$ resting against the detent $x$ until the arbor has completed one revolution, when the tooth $w^2$ lifts the detent, and the latter frees the pin $w'$, and the spring $v'$ causes the disk $w$ and pinion $w^2$ to instantly turn one revolution, when the pin $w'$ again encounters the detent $x$, which meanwhile has dropped back to place on the passage of the tooth $w^2$. Next to each pinion $w^2$ is an annular space or groove, $v^2$, these spaces being arranged alternately above and below the successive pinions.

The totalizing operation is as follows: Just before the restoring mechanism commences to turn back the first or units drum B the units-cam S tilts the lever T, and this lowers the units-arbor U until its gear $u'$ meshes with the gear $u$. As both gears $u\ u'$ have ten teeth, and as the drums B move always only in tenths of a revolution, these gears are certain to mesh correctly. The drum B is then rotated backward to zero by the restoring mechanism, and in so doing it turns the units-arbor U an equal fraction of a revolution. The arbor turns the indicating-cup $v$ with it, and if the movement is sufficient to turn this past 9 to 0, or farther, then in passing 9 the pin $w'$ is released and the pinion $w^2$ turns instantly one revolution and turns the wheel U′ of the tens-arbor one-tenth of a revolution, thus rotating that arbor and its cup $v$ that distance. When the units-wheel B reaches zero, the units-arbor U is again elevated, and then the tens arbor U is elevated until its gear $u'$ meshes with the gear $u$ of the tens-wheel B. The wheel U′ lifts with the arbor and stands with its teeth entering the groove $v^2$ above the units-pinion $w^2$, so that it can turn freely. The tens-wheel then is turned back to zero, thus rotating arbor U, and when the movement is finished this arbor drops and its wheel U′ again falls into correct mesh with the units-pinion $w^2$. The pinions $w^2$ are kept from lifting or dropping with their arbors, and so losing mesh with the wheels U′ which they actuate, by bearings $v^3\ v^3$, between which the cup $v$ and the pinion $w^2$ are confined. The hundreds-arbor U is then dropped into engagement with the wheel B, so that its gear U′ stands in the groove $v^2$ beneath the tens-pinion $w^2$. This is the position shown in Fig. 5. After the hundreds-arbor is lifted again the thousands-arbor is lifted, turned, and dropped, thus completing the operation. The thousands-arbor has no pinion $u^2$, but instead bears an eccentric, $u^3$, Fig. 6, which works a pawl, $u^4$, which pawl works a ratchet-wheel, $u^5$, which turns a drum, $v^5$, which is externally like the cups $v\ v$. This records the tens of thousands.

In addition to the mechanism already described, I also provide means for preventing either lever J or R being pulled while the other is down and before it is replaced. On one end of a shaft, Y, is fixed a lever, Y', and on its other end is fixed a lever, Y². The lever Y' has a cam, $y$, on its end, which is acted on by a piece, $y'$, on the lever R, as seen in Fig. 2. When lever R is pulled, it first, through piece $y'$, pushes back lever Y', as denoted by the arrow, before it can act on lever R' or on the printing mechanism. The lever Y² is shown in Fig. 3. It bears a pin, $y^2$, which when the apparatus is at rest stands opposite a notch, $y^3$, in the rim of the wheel M. When lever R is pulled, it presses back levers Y' and Y², and the pin $y^2$ moves freely into the notch $y^3$; but if the lever J has first been pulled the pin $y^2$ is, as shown, standing against the rim of the wheel M and cannot move; hence the lever Y' opposes the movement of the lever R. If, on the other hand, the lever R has been pulled and is not yet replaced, it holds the lever Y' back, and the pin $y^2$ is in the notch $y^3$, and hence the lever J cannot turn the wheel M.

It is obvious that instead of using needle-types $p\ p$ for pricking the numbers into the paper, ordinary raised types may be employed in connection with an inking-ribbon, as in a type-writer.

It is obvious that instead of having indicating-wheels B B separate from and operated by the curved racks D D, the racks might themselves be formed with broad peripheral surfaces, on which the figures might be marked, and on which the pricking or printing types might be mounted. This would necessitate no essential change in the apparatus, but merely a rearrangement and reproportioning of the parts, such as any intelligent mechanician could readily perform.

I claim as my invention—

1. In a counting apparatus, the combination of two successive indicating systems, each consisting of a movable indicating part having a normal tendency to move in one direction, a detent normally restraining said part from moving, and a series of keys arranged in succession each in connection with said detent, and adapted when depressed to displace said detent and thereby release the indicating part and permit the same to move, and arranged in the path of said part substantially as set forth, whereby the depressed key acts to stop the indicating part when it has moved a distance corresponding to the position of the depressed key relatively to the other keys of the series.

2. The combination, to form an indicating device, of a movable indicating part marked with digits and having a normal tendency to move in one direction, a detent restraining said part from moving, and a series of keys arranged in succession, each adapted when depressed to displace said detent and thereby release said indicating part, and to intercept or stop said part, and each key provided with a hook or shoulder adapted to be engaged by the detent, whereby the key is held depressed, substantially as set forth.

3. In a cash-counting apparatus, the combination, with an inclosing-case having a series of openings, $a\ a$, on one side and another series of openings, $c\ c$, on the other side, of a series of indicating-wheels each having marked on it two series of digits relatively inverted and arranged to correspond with the positions of the respective openings, whereby when one digit of one series is visible through an opening, $a$, the same digit of the other series is visible through an opening, $c$, substantially as set forth.

4. The combination, to form a cash-recording apparatus, of an inclosing-case having a series of openings, a slide closing said openings and having apertures registering therewith, a series of indicating systems, substantially as described, the several indicating-wheels whereof are marked with digits arranged to appear at said openings and are provided with types, a printing mechanism, substantially as described, for impressing said types upon a strip of paper, and a lever arranged in connection with said slide and printing mechanism substantially as described, whereby on depressing said lever the indicated amount is simultaneously exposed to view by said slide and printed by said printing mechanism, substantially as set forth.

5. The combination, to form a cash-recording apparatus, of wheels B B, bearing types $p\ p$, of a printing mechanism consisting of printing-roller P, frame P', in which said roller is mounted, projections $p^2\ p^2$ on said frame, shaft Q, having projections $q\ q$, and lever R, substantially as set forth.

6. In a cash-counting apparatus, the combination, to form an indicating system, of a rack, D, tending to move in one direction, a detent-lever, E, having tooth $f$, engaging said rack, and formed also with a hook or shoulder, $h'$, a spring, $e$, for said detent, a series of keys, G G, each consisting of a button, a stem, $g$, hook $h$, and spring $s$, and each adapted when depressed to displace the detent, thereby releasing the rack and to become hooked to the detent, and thereby retained in place to stop the rack, substantially as set forth.

7. In a cash-counting apparatus, the combination of an indicating system consisting of a rack, D, a detent, E, adapted to restrain said rack, and a series of keys, G G, adapted to release said detent and to intercept the rack at different points in its travel, with a restoring mechanism consisting of a rotary shaft, an arm or projection thereon adapted to engage a projection on said rack and move it back to its starting-point, and means for rotating said shaft, substantially as set forth.

8. The combination, in a cash-counting apparatus, of a series of indicating systems such as described, and a restoring mechanism, substantially as described, for turning back said systems to zero, arranged to engage the systems successively, and to restore each system before commencing to restore the succeeding one, as set forth.

9. In a cash-counting apparatus, the combination, with a series of indicating systems such as described, of a restoring mechanism consisting of the combination of a rotary shaft having arms or projections, a clock-work device adapted when wound up to rotate said shaft one revolution, a pull-lever, and means, substantially as described, interposed between said lever and said clock-work, whereby the depressing of said lever winds up and releases the same, substantially as set forth.

10. In a cash-counting apparatus, the combination, to form a restoring mechanism, of shaft F, pinion F' thereon, gear L, meshing therewith, loose wheel M, having a pawl-engaging gear, L, a spring arranged to rotate said wheel M, pull-lever J, and stop-pawl L', substantially as set forth.

11. In a cash-counting apparatus, the combination, to form a restoring mechanism, of shaft F, pinion F' thereon, gear L, having teeth $l'$ $l'$, stop-pawl L', having notch $l^2$, wheel M, having pawl M', and pull-lever J, engaging wheel M, substantially as set forth.

12. The combination, to form a cash-counting apparatus, of an indicating mechanism consisting of a series of indicating systems such as described, the several systems indicating units, tens, hundreds, &c., with a totalizing mechanism, such as described, consisting of a series of corresponding systems for units, tens, hundreds, &c., and operative connection, substantially as described, between each of the indicating systems and the corresponding systems of the totalizing mechanism, whereby the movements of the several indicating systems are imparted to the respective totalizing systems and the numbers indicated by each of the former are added to the total sum indicated by the latter, substantially as set forth.

13. The combination, to form a cash-counting apparatus, of an indicating mechanism consisting of a series of indicating systems such as described, indicating, respectively, units, tens, hundreds, &c., a totalizing mechanism, such as described, consisting of a series of corresponding systems for units, tens, hundreds, &c., a restoring mechanism for the indicating systems, substantially as described, whereby they are turned back to zero successively one at a time, and connecting mechanism, substantially as described, between each indicating system and the corresponding totalizing system, whereby during the turning back of the former it is connected to and turns forward the latter, thereby adding the number which has been indicated to the total sum recorded by the totalizing mechanism, substantially as set forth.

14. The combination, to form a cash-counting apparatus, of a series of indicating systems such as described, a totalizing mechanism such as described, a restoring mechanism such as described, and means substantially as described, the operation of which brings the totalizing mechanism into operative connection with the restoring and indicating mechanisms, whereby the manipulation of such means before the restoring is essential to the operation of the totalizing mechanism.

15. In a cash-counting apparatus, the combination, with the several indicating-wheels B B of the series of indicating systems such as described, of a gear, $u$, fixed to each wheel and having ten teeth, a series of totalizing-arbors, U U, each having fixed to it a gear, $u'$, having ten teeth adapted to mesh with the gears $u$ $u$, and means, substantially as described, for moving said arbors to bring their said gears into and out of mesh with the gears $u$ $u$, substantially as set forth.

16. In a cash-counting apparatus, the combination, with the several indicating-wheels B B, of gears $u$ $u$, fixed respectively thereto, totalizing-arbors U U, having gears $u'$ $u'$ fixed to them respectively, and adapted to mesh with the gears $u$ $u$, levers T T, adapted to move said arbors endwise to bring their gears $u'$ into mesh with gears $u$, cams S S, adapted to operate said levers, and rotary shaft F, carrying said cams, substantially as set forth.

17. In a cash-counting apparatus, the combination, with the several indicating systems, of a totalizing mechanism consisting of a series of totalizing-arbors, U U, bearing indicating-drums, pinions $u^2$ $u^2$, borne by said arbors, spring and escapement device, substantially as described, for releasing each pinion upon its arbor having completed one revolution, and causing it to revolve, gears U' U', fixed to the respective arbors and normally meshing with said pinions, and means for successively rotating said arbors through the medium of the indicating system, substantially as set forth.

18. In a cash-counting apparatus, the combination, with the series of indicating systems substantially as described, the restoring mechanism substantially as described, and the totalizing mechanism substantially as described, of means, substantially as described, for longitudinally displacing the restoring-shaft, and consequently bringing operative cam projections or depressions into action to manipulate the totalizing mechanism, as set forth.

19. In a cash-counting apparatus, the combination, with a series of indicating systems, a totalizing mechanism, and a restoring mechanism, the latter consisting in part of a rotating shaft, F, of a series of cams, S S, on said shaft, a series of levers, T T, operated by said cams and manipulating the totalizing mechanism, means, substantially as described, for displacing said shaft endwise to bring said cams into operative connection with said levers, and means, substantially as described, for automatically shifting back said shaft at the end of its rotation, substantially as set forth.

20. In a cash-counting apparatus, the combination, with restoring-shaft F and the mechanism for rotating it, of a snail, K, fixed to it, spring-lever $k$, displaced by said snail, hammer $z$, borne by said lever, and bell Z, arranged to be struck by said hammer on the dropping of the lever by the end of the snail, substantially as set forth.

21. In a cash-recording apparatus, the combination of pull-levers R and J, shaft Y, and levers $Y'$ and $Y^2$, fixed thereon, and constructed, substantially as described, relatively to said levers R J, whereby on the displacement of levers $Y'$ $Y^2$ by the pulling of either lever R or J they act as a stop to prevent the pulling of the other lever, substantially as set forth.

In witness whereof I have hereunto signed my name in the presence of two subscribing witnesses.

HENRY POTTIN.

Witnesses:
    EDWARD P. MACLEAN,
    AMAND RITTER.